July 12, 1932.    F. DETILLOUX    1,866,755

BRAKE

Filed July 18, 1928

Inventor:-
François Detilloux

Patented July 12, 1932

1,866,755

UNITED STATES PATENT OFFICE

FRANÇOIS DETILLOUX, OF BRUSSELS, BELGIUM

BRAKE

Application filed July 18, 1928, Serial No. 293,688, and in Belgium July 27, 1927.

The invention relates to a back-pedal or coaster brake. The brake of the invention may be mounted on an existing bicycle without requiring the replacement of existing parts.

The accompanying drawing, by way of example only, illustrates an embodiment of the invention which extends to the various original features comprised therein.

Figure 1:
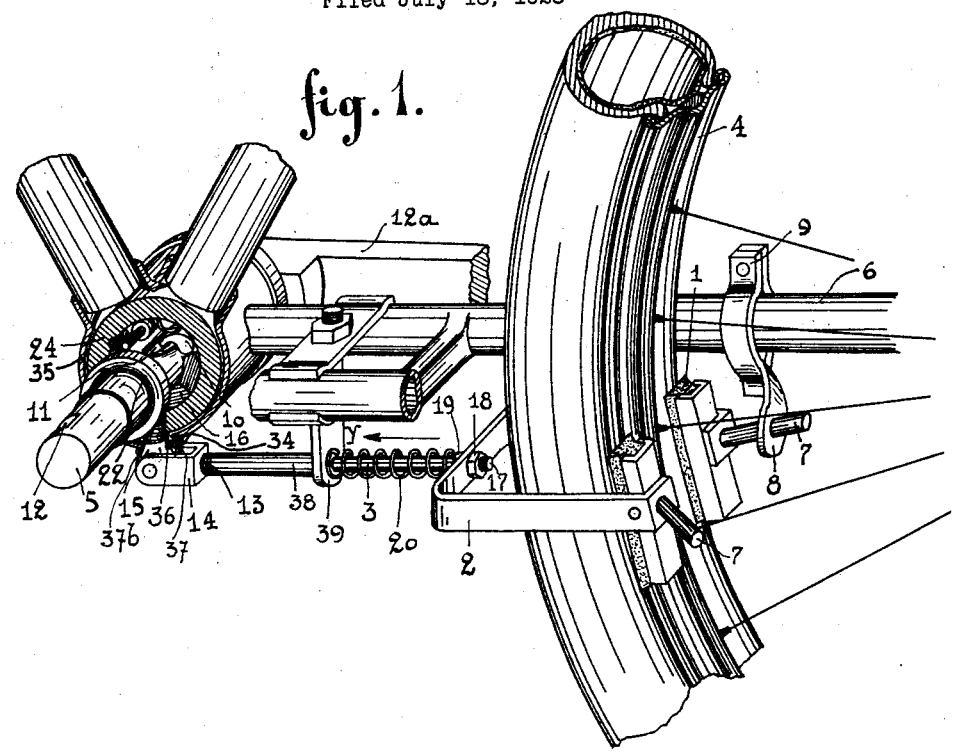
Fig. 1 is a partially broken-away perspective view of the invention mounted on a bicycle.
Figure 2:
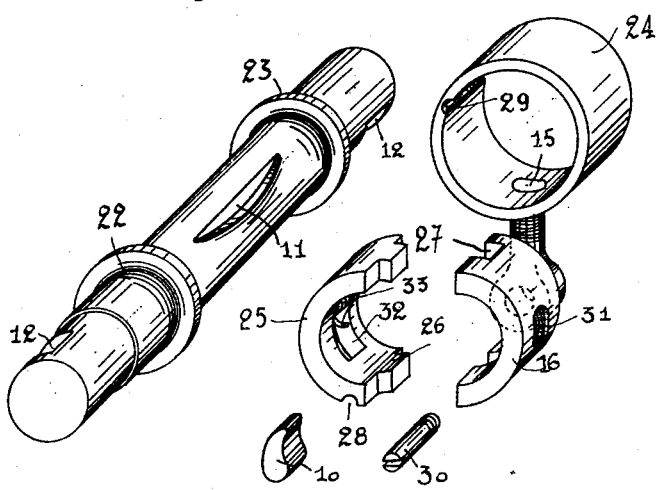
Fig. 2 shows the various parts, unassembled, of a member intended to be mounted on the axis of the pedal crank axle.
Figure 3:
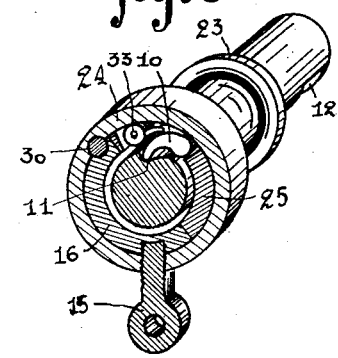
Fig. 3 is a section showing the members of Fig. 2 assembled.

According to Figs. 1, 2 and 3 the brake comprises the friction members 1 carried on a shackle 2 connected to a rod 3. The above friction elements 1 are carried toward the rim 4 of the wheel to be braked, during back-pedaling, by movement along the arrow Y of said rod, this movement being produced by converting the circular movement of the axis 5 of the pedal crank-axle into a rectilinear movement of said rod by means of elements hereinafter described.

In order that the shackle 2 may slide along the rear fork 6 of the bicycle, this shackle is provided with bars 7 adapted to slide in lugs such as 8 of straps such as 9 assembled on said rear fork.

The free rotation of the axis 5 in the direction of pedaling is limited in the opposite direction by a pawl 10 engaging a notch 11 provided on said axis.

In order to obtain the greatest force at the moment of braking, the invention provides that the notch 11 is arranged in a plane perpendicular to the grooves 12 of the pedals, at this moment horizontal, and one of which, 12a, is partially shown. Rod 3 is also screwed by one of its ends 13 to a shackle 14 pivoting about a socket screw 15 screwed on a member 16. In order to regulate the length of this rod its other end 17 is affixed to the shackle 2 of the brake by means of a nut 18 and a lock nut 19.

Also, in order to withdraw the brake mechanism 3 and 1 to its normal position, a spring 20 is mounted on the rod 3. In addition, on the axis 5 of the pedal crank-axle and between the races 22 and 23, cast in one piece with said axis, there is a member consisting of several parts, and particularly of a sleeve or socket 24 traversed by the socket screw 15 and assuring connection with the friction blocks 1.

The sleeve 24 encompasses two crown segments 16 and 25 adapted to be arranged about the axis 5 of the pedal crank-axle. These segments are provided with projections and grooves 26 and 27 which, when assembled, form a housing in a direction parallel with the axis of the axle.

The segment 25 is provided with a cavity 28 which comes opposite a cavity 29 provided on the inner surface of sleeve 24, these two cavities forming a seat for the reception of an assemblage screw 30. The segment 16 is provided with a threaded opening 31 arranged in the axis of the socket screw 15, which completes the assemblage of the segments contained within the sleeve.

Provided in segment 25 is an opening 32 adapted to receive the pawl 10 cooperating with the notch 11 provided on the axis 5 of the axle. A spring 33 is provided in this opening in such manner that the point of the pawl 10 is constantly drawn toward the axis 5 of the axle, said pawl being retained in its seat by the simple assemblage of the parts.

As shown on Fig. 1, the socket screw 15 integral with the crown segment 16 encompassed by the sleeve 24 passes through an opening 34 provided in the bearing housing 35 of the axis 5. This opening is closed by a plate 36 actuated or operated by the socket screw 15 and applied on the wall of the bearing housing 35 by a spring 37b bearing on the head of the screw 15. Contact between plate 36 and housing 35 is established by means of a joint of flexible material 37 such as felt.

In addition, the rod 3, connected on the one hand, to the friction blocks 1 and pivoted, on the other hand, to the socket screw 15, has an enlarged portion 38 which, when the brake is not applied, through the action of the spring 20 abuts against a member 39 rigidly connected with the front part of the fork. This latter arrangement prevents excessive friction at the joint where the crown segment 16 and 25 contact with the axis 5 of the axle under the action of the spring 20.

It is of course obvious that after the invention is once disclosed numerous modifications thereof will readily occur to those skilled in the art. Accordingly, it is intended that the invention be limited only by the scope of the appended claims.

What I claim is:

1. A brake device for bicycles or the like comprising a rod; braking blocks on one end of said rod; a pedal-crank-axle having a notch therein; a box surrounding said axle in spaced relation therewith; an element disposed around said axle, and arranged interiorly of said box; said element being comprised of two parts adapted to be joined together, a screw fixed to one of said parts, and having an eye, whereby a yoke on the said rod may be connected with said part, said rod thus being pivotally connected to said element; pawl mounted on said element; and resilient means urging said pawl into engagement with said notch, to cause rotation of the element upon rearward rotation of the axle, producing displacement of the rod and braking blocks.

2. A brake device for bicycles or the like comprising a rod; braking blocks on one end of said rod; a pedal-crank-axle having a notch therein; a box surrounding said axle in spaced relation therewith; an element disposed around said axle, and arranged interiorly of said box, the said element comprising a hollow ring having a hole for the reception of a pawl and its spring, a sleeve snugly arranged about said hollow ring, the inside diameter of the hollow ring being such as to permit its placement on the pedal-crank-axle, the said ring being composed of independent segments disposed around said axle and being maintained in place by the surrounding sleeve, the inside diameter of said sleeve being such that it may be placed above the ground and prominent parts of the pedal-crank-axle, the segments being provided on the faces by which they come into mutual contact with cooperating grooves and projections for joining themselves to each other, said rod being pivotally connected to said element, the pawl mounted on said element being adapted to engage in the notch in said axle, and a spring urging said pawl into engagement with said notch, to cause rotation of the element upon rearward rotation of the axle, producing displacement of the rod and braking blocks.

3. A brake device for bicycles or the like comprising a rod; braking blocks on one end of said rod; a pedal-crank-axle having a notch therein; a box surrounding said axle in spaced relation therewith; an element disposed around said axle, and arranged interiorly of said box; said element comprising a hollow ring, a hole for the reception of a pawl and its resilient pressing means, a sleeve arranged snugly around said hollow ring, the inside diameter of the sleeve ring being such as to permit its placement upon the pedal-crank-axle, the ring being comprised of independent segments disposed around said axle and being maintained in place by the surrounding sleeve, the inside diameter of the sleeve being such as to permit its being placed above the prominent parts of the pedal-crank-axle, the segments each being provided on their faces which come into mutual contact with grooves and projections whereby they are joined together, the segmental ring being fixed to the sleeve by a screw partially engaged between the said ring and the said sleeve, said rod being pivotally connected to said element, the pawl mounted on said element being adapted to engage the notch in said axle and resilient means urging said pawl into engagement with said notch, to cause rotation of the element upon rearward rotation of the axle, producing displacement of the rod and the braking blocks.

4. A brake device for bicycles or the like comprising a rod; braking blocks on one end of said rod; a pedal-crank-axle having a notch therein; a box surrounding said axle in spaced relation therewith; an element disposed around said axle, and arranged interiorly of said box; said element being comprised of a hollow ring, having a hole for the reception of a pawl and its resilient pressing means, a sleeve arranged snugly around said hollow ring, the inside diameter of the hollow ring being such as to permit its placement on the pedal-crank-axle, the said ring being made of independent segments disposed around said axle and being maintained in place by the surrounding sleeve, the inside diameter of said sleeve being such that it may be placed above the prominent parts of the pedal-crank-axle, said segments being provided on their faces by which they come into mutual contact with grooves and projections interengaging each other, a screw partially engaged between the segmental ring and the sleeve and fixing the two together, an additional screw carried by the sleeve and provided with an eye, a yoke on the rod joined to the braking blocks and adapted for connection to said eye, the end of the said last-mentioned screw being engaged in the segmental ring, the pawl mounted on the said element being adapted to engage the notches in said axle, and resilient means urging said pawl into engagement with said notch, to cause rotation of the element upon rearward rotation of the axle, producing displacement of the rod and braking block.

In testimony whereof I have affixed my signature.

FRANÇOIS DETILLOUX.